US00RE34290E

United States Patent [19]

Tobita

[11] E Patent Number: Re. 34,290

[45] Reissued Date of Patent: Jun. 22, 1993

[54] CONSTANT VOLTAGE GENERATING CIRCUIT

[75] Inventor: Yoichi Tobita, Hyogo, Japan

[73] Assignee: Mitsubishi Denki K.K., Tokyo, Japan

[21] Appl. No.: 735,129

[22] Filed: Jul. 24, 1991

Related U.S. Patent Documents

Reissue of:

[64] Patent No.: 4,670,706
Issued: Jun. 2, 1987
Appl. No.: 824,830
Filed: Jan. 31, 1986

[30] Foreign Application Priority Data

Mar. 27, 1985 [JP] Japan ..... 60-65712

[51] Int. Cl.[5] ..... G05F 3/24

[52] U.S. Cl. ..... 323/313; 323/315; 307/296.1; 307/296.5; 307/296.8; 365/189.09

[58] Field of Search ..... 323/313, 314, 315, 316; 307/296.1, 296.5, 296.8; 365/189.09

[56] References Cited

U.S. PATENT DOCUMENTS

| | | | |
|---|---|---|---|
| 4,160,176 | 7/1979 | Takahashi | 307/304 X |
| 4,205,263 | 5/1980 | Kawagai et al. | 323/317 |
| 4,293,782 | 10/1981 | Tanaka et al. | 307/304 X |
| 4,323,846 | 4/1982 | Haraszti | 323/311 |
| 4,692,689 | 9/1987 | Takemae | 323/313 |

*Primary Examiner*—Emanuel T. Voeltz
*Attorney, Agent, or Firm*—Sughrue, Mion, Zinn, Macpeak & Seas

[57] ABSTRACT

In a constant voltage generating circuit, a predetermined voltage outputted by voltage applying means connected between first and second power source terminals is simultaneously applied to the control electrode of a first MOS transistor of a first polarity and the control electrode of a second MOS transistor of a second polarity which are provided complementarily, and a voltage obtained by subtracting the threshold voltage of the first MOS transistor from the potential at the control electrode of the first MOS transistor is applied to the control electrode of a third MOS transistor of the second polarity while a voltage obtained by adding the potential at the control electrode of the second MOS transistor to the threshold voltage of the second MOS transistor is applied to a fourth MOS transistor of the first polarity, so that each of the third and fourth MOS transistors is operated in the critical state between the conductive state and the non-conductive state, whereby positive or negative noise voltage included in the output voltage of the circuit is quickly eliminated.

This is a Reissue of a Patent which was the subject of a Reexamination Certificate No. B1 4,670,706, dated Jul. 25, 1989, Request No. 90/001689.

20 Claims, 3 Drawing Sheets

CONSTANT VOLTAGE GENERATING CIRCUIT

Matter enclosed in heavy brackets [ ] appears in the original patent but forms no part of this reissue specification; matter printed in italics indicates the additions made by reissue.

BACKGROUND OF THE INVENTION

This invention relates to constant voltage generating circuits, and more particularly to a constant voltage generating circuit in the form of a semiconductor integrated circuit.

In the following description, insulated gate field-effect transistors will be referred to as "MOS transistors", when applicable.

One example of a conventional constant voltage generating circuit is as shown in FIG. 5. In this circuit, a predetermined voltage is applied to a power source terminal 1, and a series circuit of a resistor 3 having a resistance $R_3$ and a resistor 4 having a resistance $R_4$ is connected between the terminal 1 and ground. The connecting point 2 of the resistors 3 and 4 is an output terminal from which the output voltage of the constant voltage generating circuit is applied. A decoupling capacitor 5 for stabilizing the output voltage at the output terminal 2 is connected between the connecting point 2 and ground.

The operation of the conventional constant voltage generating circuit thus organized will now be described.

In the circuit of FIG. 5, the output voltage at the output terminal 2 is determined from the supply voltage at the power source terminal 1 and the resistance of the resistors 3 and 4. That is, the output voltage $V_2$ at the output terminal 2 is:

$$V_1 = \frac{R_4}{R_3 + R_4} V \quad (1)$$

where V is the supply voltage at the power source terminal 1.

As is apparent from equation (1), the output voltage $V_2$ changes in proportion to the supply voltage V. Therefore, the constant voltage generating circuit in FIG. 5 is employed as a voltage source where it is acceptable for the output voltage to follow the supply voltage, such as a reference voltage source in a sense amplifier circuit for a dynamic random access memory.

FIG. 6 shows another example of a conventional constant voltage generating circuit. In the circuit of FIG. 6, a predetermined voltage is applied to a power source terminal 11, and a series circuit of a resistor 13 and a plurality of N-type MOS transistors 16a through 16n is connected between the terminal 11 and ground. In each of the MOS transistors, the drain electrode is connected to the gate electrode. Each of the MOS transistors has a threshold voltage $V_{THN}$. The connecting point 12 of the resistor 13 and the N-type MOS transistor 16a, i.e, an output terminal, is grounded through a decoupling capacitor 15 adapted to stabilize the output voltage of the output terminal 12.

The operation of the circuit shown in FIG 6 will be now described. In the case where the resistance of the resistor 13 is higher than the resistance of the N-type MOS transistors 16a through 16n which are turned on, then the output voltage $V_{12}$ at the output terminal 12 is:

$$V_{12} \approx n \cdot V_{THN} \quad (12)$$

Accordingly, the output $V_{12}$ is maintained constant irrespective of the variation of the supply voltage at the power source terminal 11. Therefore, the constant voltage generating circuit in FIG 6 is employed as a voltage source in which the output voltage is independent of the supply voltage, such as a reference voltage source for a MOS side differential amplifier circuit in the transition from TTL level to MOS level.

In the circuit of FIG. 5, a DC current flows through the resistors 3 and 4. In the circuit of FIG. 6, a DC current flows through the resistor 13 and the N-type MOS transistors 16a through 16n. Therefore, it is necessary to increase the resistance of the resistors 3, 4 and 13 as much as possible (several megohms to several tens of megohms) to decrease the DC currents as much as possible, to thereby minimize the power consumption of the circuits. However, if the resistances are increased, then the output voltage are liable to be affected by noise which is produced in the operation of the integrated circuit. Therefore, the output voltage must be stabilized by connecting a decoupling capacitor (generally 10 pF to 100 pF) such as the capacitor 5 in FIG. 5 or the capacitor 15 in FIG. 15. Such a decoupling capacitor occupies a relatively large part of the area of the semiconductor chip. This is one of the difficulties accompanying the conventional constant voltage generating circuit.

In a dynamic random access memory to which the above-described constant voltage generating circuits can be applied supply voltage variation is commonly tested by repeatedly increasing and decreasing the supply voltage between 4.5 V and 5.5 V. In this connection, the conventional constant voltage generating circuits suffer from the difficulty that, because of the large resistance and the large stabilizing capacitance, the output voltage of the constant generating circuit cannot quickly follow the variation of the supply voltage; that is, it takes time for the output voltage to reach the predetermined value, as a result of which the time required for a supply voltage variation test is unavoidably long.

SUMMARY OF THE INVENTION

Accordingly, an object of this invention is to eliminate the above-described difficulties accompanying a conventional constant voltage generating circuit.

More specifically, an object of the invention is to provide a constant voltage generating circuit in which a pair of MOS transistors are complementarily provided in the output stage thereof, and each of these transistors is operated in the critical state between the conductive state and the nonconductive state thereof to quickly eliminated noise voltage which may be included in the output voltage of the circuit, whereby the power consumption is reduced while the output voltage is maintained free from noise voltage.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
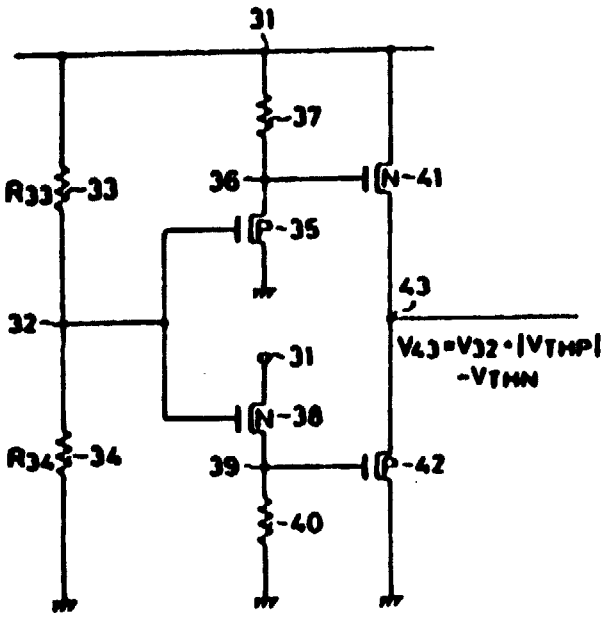
FIG. 1 is a schematic diagram of a first embodiment of a constant voltage generating circuit according to the present invention.

A first example of a constant voltage generating circuit according to this invention is shown in FIG. 1. In this circuit, a predetermined voltage is applied to a first power source terminal 31. A series circuit of a resistor 33 having a resistance $R_{33}$ and a resistor 34 having a resistance $R_{34}$ is connected between the terminal 31 and ground. The connecting point 32 of the resistors 33 and 34 is connected to the gate electrode of a P-type MOS transistor 35, the source electrode of which is connected through a connecting point 36 and a resistor 37 to the first power source terminal 31. The drain electrode of the P-type MOS transistor 35 is grounded. The connecting point 32 is further connected to the gate electrode of an N-type MOS transistor 38, the drain electrode of which is connected to the first power source terminal. The source electrode of the transistor 38 is grounded through a connecting point 39 and a resistor 40. The connecting point 36 is connected to the gate electrode of an N-type MOS transistor 41, the drain electrode of which is connected to the first power source terminal 31. The connecting point 39 is connected to the gate electrode of a P-type MOS transistor 42, the drain electrode of which is grounded. The source electrodes of the N-type MOS transistor 41 and the P-type MOS transistor 42 are connected together, thus providing an output terminal 43.

The operation of the circuit shown in FIG. 1 will now be described. In circuit of FIG 1, the voltage at the connecting point 32 is determined from the supply voltage at the terminal 31 and the resistances of the resistors 33 and 34. That is, the voltage $V_{32}$ at the connecting point 32 can be represented by the following equation:

$$V_{32} = \frac{R_{34}}{R_{33} + R_{34}} V \tag{3}$$

where V is the supply voltage provided at the terminal 31.

The resistors 33 and 34 are electrically insulated from the output terminal 43 and therefore not affected by the noise provided at the output terminal 43. Accordingly, the resistances of the resistors 33 and 34 can be set to high values so that a DC current flowing through the resistors is decreased.

The resistance of the resistor 37 is set to more than 100 times the resistance of the P-type MOS transistor 35 provided when the latter 35 is turned on. When, under this condition, the voltage $V_{32}$ at the connecting point 32 is applied to the gate electrode of the MOS transistor 35, the voltage $V_{36}$ at the source electrode of the MOS transistor 35, i.e, at the connecting point 36, is:

$$V_{36} = V_{32} + |V_{THP}| \tag{4}$$

where $V_{THP}$ is the threshold voltage of the P-type MOS transistor 35.

That is, voltage at the connecting point 36 is the sum of the gate potential of the P-type MOS transistor 35 and its threshold voltage.

On the other hand, the resistance of the resistor 40 is set to more than 100 times the resistance of the N-type MOS transistor 38 provided when the latter 38 is turned on. When, under this condition, the voltage $V_{32}$ at the connecting point 32 is applied to the gate electrode of the N-type MOS transistor 38, the voltage at the source electrode of the MOS transistor 38, i.e., at the connecting point 39, is as follows:

$$V_{39} = V_{32} - V_{THN} \tag{5}$$

where $V_{THN}$ is the threshold voltage of the N-type MOS transistor 38.

That is, the voltage at the connecting point 39 is obtained by subtracting the threshold voltage of the MOS transistor 38 from its gate potential.

The voltage $V_{36}$ at the connecting point 36 is applied to the gate electrode of the N-type MOS transistor 41, and the voltage $V_{39}$ at the connecting point 39 is applied to the gate electrode of the P-type MOS transistor 42. For convenience in description, let it first be assumed that the N-type MOS transistor 41 and the P-type MOS transistor 42 are not connected to one another at the output terminal 43. In this case, the source potential $V_{43'}$ is lower by the threshold voltage than the gate potential $V_{36'}$ and therefore the source potential $V_{43'}$ is:

$$\begin{aligned} V_{43'} &= V_{36} - V_{THN} \\ &= V_{32} + |V_{THP}| - V_{THN} \end{aligned} \tag{6}$$

On the other hand, the P-type MOS transistor 42 is rendered conductive only when the source potential $V_{43''}$ becomes equal to or higher than the sum of the gate potential $V_{39}$ and the absolute value of the threshold value.

Therefore, $$\begin{aligned} V_{43''} &= V_{39} + |V_{THP}| \\ &= V_{32} + |V_{THP}| - V_{THN} \end{aligned} \tag{7}$$

From the equations (6) and (7), $$\begin{aligned} V_{43'} &= V_{43''} = V_{43} \\ &= V_{32} + |V_{THP}| - V_{THN} \end{aligned} \tag{8}$$

The equation (8) means that, even if the output terminal 43 is connected, no current flows, and the voltage at the output terminal 43 is maintained constant, $V_{32} + |V_{THP}| - V_{THN}$.

Under this condition, each of the MOS transistors 41 and 42 operates in a critical state between an "on" state and an "off" state. Therefore, for instance when a positive noise voltage is provided at the output terminal 43, the P-type MOS transistor 42 is rendered conductive to eliminate the noise voltage. Similarly, when a negative noise voltage is provided at the output terminal 43, the N-type MOS transistor 41 is rendered conductive to eliminate the noise voltage.

As is apparent from the equation (8), the output voltage at the output terminal 43 is determined only by the voltage at the connecting point 32 and the threshold voltages of the MOS transistors, and is completely independently of the resistances of the MOS transistors which are provided when the latter are rendered conductive (on) (hereinafter referred to as "on-resistances" when applicable).

Accordingly, the on-resistances of the MOS transistors 41 and 42 forming the output stage of the constant voltage generating circuit can be freely decreased. Accordingly, in the case when the output voltage at the output terminal 43 includes a noise voltage, the output impedance of the constant voltage generating circuit can be decreased, and therefore the noise voltage can be eliminated quickly.

Figure 2:
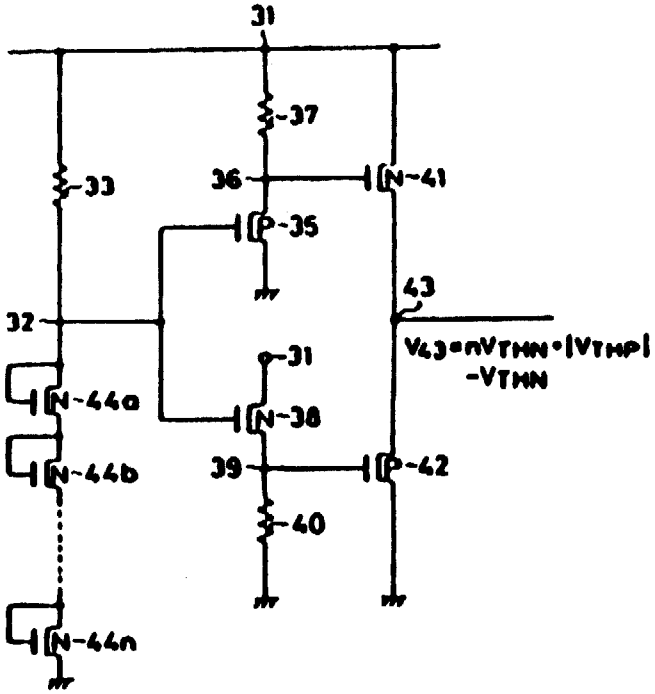
FIG. 2 is a schematic diagram of a second embodiment of the constant voltage generating circuit according to the present invention.
Figure 6:
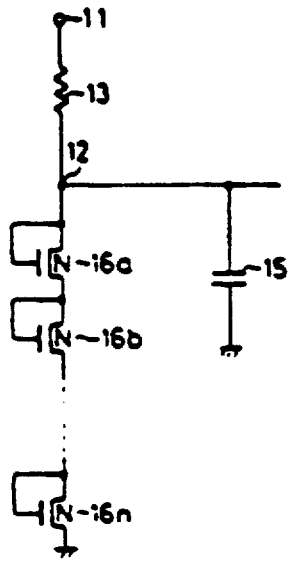
FIG. 6 PRIOR ART
FIG. 6 is a schematic diagram of a conventional constant voltage generating circuit having an output voltage independent of supply voltage.

FIG. 2 shows a second example of the constant voltage generating circuit according to the invention. The circuit shown in FIG. 2 is equal to that shown in FIG. 1 except for the following point. Instead of the resistance 34 in FIG. 1, a series circuit of an N-type MOS transistors 44a through 44n are connected between the connecting point 32 and ground. A circuit made up of the power source terminal 31, the resistor 33, and the N-type MOS transistors 44a through 44n is equivalent to the conventional constant voltage generating circuit shown in FIG. 6. A constant voltage $V_{32}$ is provided at the connecting point 32 irrespective of the supply voltage at the power source terminal 31.

That is, if the resistance of the resistor 33 is set to about 100 times the on-resistance of the N-type MOS transistors 44a through 44n, then the voltage $V_{32}$ at the connecting point 32 is:

$$V_{32} \simeq n \cdot V_{THN} \tag{9}$$

The operation of the circuit of FIG. 2 subsequent to the connecting point 32 is the same as that in FIG. 1. Therefore, the output voltage $V_{43}$ at the output terminal 43 can be represented by the following equation (10):

$$V_{43} = n \cdot V_{THN} + |V_{THP}| - V_{THN}$$

Figure 3:
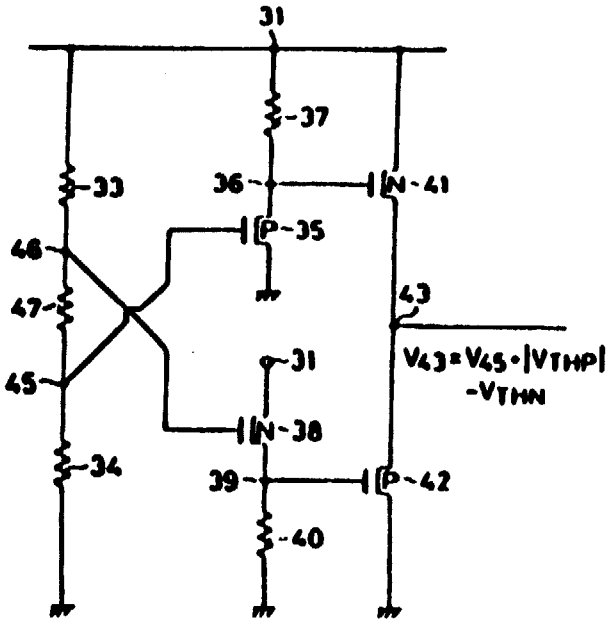
FIG. 3 is a schematic diagram of a third embodiment of the constant voltage generating circuit according to the present invention.
Figure 5:
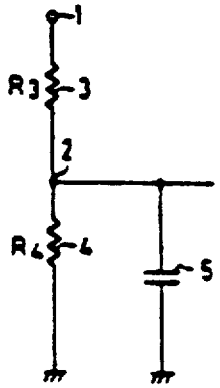
FIG. 5 PRIOR ART
FIG. 5 is a schematic diagram of a constant voltage generating circuit having an output voltage variable with supply voltage.

FIG. 3 shows a third example of the constant voltage generating circuit according to the invention. The circuit of FIG. 3 is similar to the circuit shown in FIG. 1 except for the following point: In the first example shown in FIG. 1, each of the MOS transistors 41 and 42 operates in the critical state between the "on" state and the "off" state. Therefore, in the case where, because of variations in manufacture, the threshold voltages of the MOS transistors 41 and 42 are not equal to those of the MOS transistors 35 and 38, both of the MOS transistors 41 and 42 may be rendered conductive simultaneously, as a result of which unwanted current may flow between the power source terminal 31 and ground.

In order to overcome the difficulty, in the circuit of FIG. 3, a resistor 47 is connected between the resistors 33 and 34, and the connecting points 45 and 46 are connected to the gate electrodes of the MOS transistors 35 and 38, respectively, so that a potential difference corresponding to a voltage drop across the resistor 47 is provided between the gates of the MOS transistors. Accordingly, in the circuit of the FIG. 3, the P-type MOS transistor 42 operates in the "off" region according to the voltage drop by the resistor 47, which compensates for the variations in threshold voltage of the MOS transistors which may be caused during manufacture.

Figure 4:
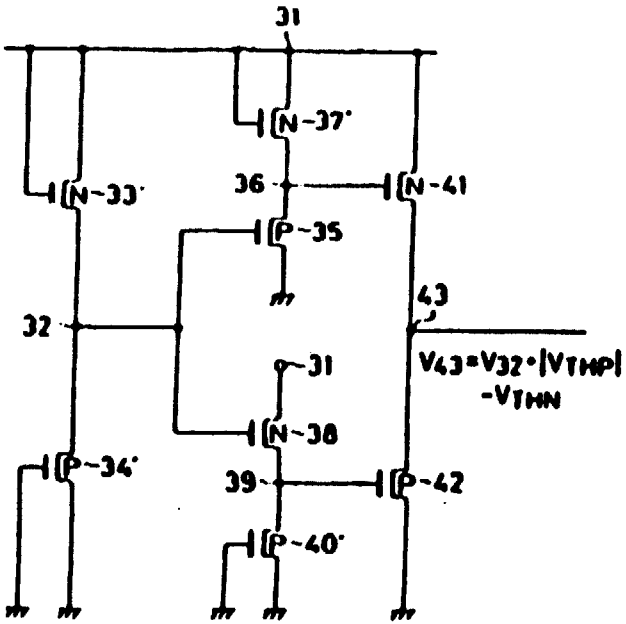
FIG. 4 is a schematic diagram of a fourth embodiment of the constant voltage generating circuit according to the present invention.

FIG. 4 shows a fourth example of the constant voltage generating circuit. The circuit of FIG. 4 is similar to that of FIG. 1 except for the following point: In the circuit of FIG. 4, high resistance MOS transistors 33', 34', 37' and 40' are employed instead of the resistors 33, 34, 37 and 40 in FIG. 1 because a MOS transistor resistance element is higher in resistance and smaller in occupied area than a diffusion layer or polysilicon resistance element As is apparent from the above description, according to the invention, the complementarily coupled MOS transistors are provided in the output stage of the constant voltage generating circuit, and each of the MOS transistor is operated in the critical state between the "on" state and the "off" state. Therefore, positive or negative noise voltages included in the output voltage can be quickly suppressed. Furthermore, when no noise is included in the output voltage, current scarcely flows between the power source terminal and the ground, and therefore the power consumption is decreased as much. In addition, since no capacitor for stabilizing the output voltage is required, the tracking characteristic of the output voltage with respect to the supply voltage variation can be improved, and the time required for a supply voltage variation test or the like can be shortened.

What is claimed is:

[1. A constant voltage generating circuit comprising:

a first insulated gate field-effect transistor of a first polarity having a pair of main electrodes and a control electrode and connected between a first power source terminal and an output terminal;

a second insulated gate field-effect transistor of a second polarity having a pair of main electrodes and a control electrode and connected between said output terminal and a second power source terminal; and control voltage applying means for applying a first intermediate potential provided between a first potential at said first power source terminal and a second potential at said second power source terminal to the control electrode of said first insulated gate field-effect transistor, and for applying a second intermediate potential provided between said first potential and said second potential to the control electrode of said second insulated gate field-effect transistor, said first intermediate potential being at all times greater than said second intermediate potential by substantially the sum of the threshold voltages of said first and second insulated gate field-effect transistors.]

2. A constant voltage generating circuit comprising:

a first insulated gate field-effect transistor of a first polarity having a pair of main electrodes and a control electrode and connected between a first power source terminal and an output terminal;

a second control insulated gate field-effect transistor of a second polarity having a pair of main electrodes and a control electrode and connected between said output terminal and a second power source terminal;

control voltage generating means for applying a first intermediate potential provided between a first potential at said first power source terminal and a second potential at said second power source terminal to the control electrode of said first insulated gate field effect transistor, and for applying a second intermediate potential provided between said first potential and said second potential to the control electrode of said second insulated gate field-effect transistor, said first intermediate potential being at all times greater than said second intermediate potential by substantially the sum of threshold voltages of said first and second insulated gate field-effect transistors, said control voltage generating means comprising:

voltage division potential means connected between said first and second power source terminals, for providing a voltage division potential at an output node;

first control voltage generating means having a third insulated gate field-effect transistor of said second polarity, said third insulated gate field-effect transistor having a pair of main electrodes and a control electrode, one of said pair of main electrodes being connected to said first power source terminal through a first load element and to the control electrode of said first insulated gate field-effect transistor, the other main electrode being connected to said second power source terminal, and said control electrode being connected to said output node of said voltage division potential generating means, for providing said first intermediate potential at said one main electrode; and second control voltage generating means having a fourth insulated gate field-effect transistor of said first polarity; said fourth insulated gate field-effect transistor having a pair of main electrodes and a control electrode, one of said main electrodes being connected to said second power source terminal through a second load element and to the control electrode of said second insulated gate field-effect transistor, the other main electrode being connected to said first power source terminal, and said control electrode being connected to said output node of said voltage division potential generating means, for providing said second intermediate potential at said one main electrode of said fourth insulated gate field-effect transistor.

3. A constant voltage generating circuit as claimed in claim 2, in which said first intermediate potential provided by said first control voltage generating means is the sum of said voltage division potential and the threshold voltage of said third insulated gate field-effect transistor, and said second intermediate potential provided by said second control voltage generating means is the difference obtained by subtracting the threshold voltage of said fourth insulated gate field-effect transistor from said voltage division potential.

4. A constant voltage generating circuit as claimed in claim 2, in which said first load element in said first control voltage generating means is a fifth insulated gate field-effect transistor of said first polarity, and said second load element in said second control voltage generating means is a sixth insulated gate field-effect transistor of said second polarity.

5. A constant voltage generating circuit as claimed in claim 2, in which:

said voltage division potential generating means has a seventh insulated gate field-effect transistor of said first polarity connected between said first power source terminal and said output node, and an eighth insulated gate field-effect transistor of said second polarity connected between said output node and said second power source terminal, and said first load element in said first control voltage generating means is a fifth insulated gate field-effect transistor of said first polarity, and said second load element in said second control voltage generating means is a sixth insulated gate field-effect transistor of said second polarity.

6. A constant voltage generating circuit as claimed in claim 19, in which said control voltage applying means comprises:

voltage division potential generating means having first and second output nodes, a first resistive element connected between said first power source terminal and said first output node, a second resistive element connected between said first and second output nodes, and a third resistive element connected between said second output node and said second power source terminal;

first control voltage generating means comprising a third insulated gate field-effect transistor of said second polarity having a pair of main electrodes and a control electrode, one of said main electrodes being connected to said first power source terminal through a first load element and to the control electrode of said first insulated gate field-effect transistor, the other main electrode being connected to said second power source terminal, and said control electrode being said second output node of said voltage division potential generating means, for providing said first intermediate potential at said one main electrode of said third insulated gate field effect transistor; and second control voltage generating means comprising a fourth insulated gate field-effect transistor of said first polarity having a pair of main electrodes and a control electrode, one of said main electrodes being connected to said second power source terminal through a second load element, the other main electrode being connected to said first power source terminal, and said control electrode being connected to first output node of said voltage division potential generating means, for providing said second intermediate potential at said one main electrode of said fourth insulated gate field-effect transistor.

7. A constant voltage generating circuit, comprising:

a first insulated gate field-effect transistor having a pair of main electrodes and a control electrode and connected between a first power source terminal and an output terminal;

a second insulated gate field-effect transistor having a pair of main electrodes and a control electrode and connected between said output terminal and a second power source terminal;

voltage division potential generating means connected between said first and second power source terminals, for providing a voltage division potential at an output node thereof;

a third insulated gate field-effect transistor of said second polarity having a pair of main electrodes and a control electrode, one of said main electrodes being connected to said first power source terminal through a first load element and to the control electrode of said first insulation gate field-effect transistor, the other main electrode being connected to said second power source terminal, and said control electrode being connected to said output node of said voltage division potential generating means; and a fourth insulated gate field-effect transistor of said first polarity having a pair of main electrodes and a control electrode, one of said main electrodes being connecting to said second power source terminal through a second load element and to the control electrode of said second insulated gate field-effect transistor, the other main electrode being connected to said first power source terminal, and said control electrode being connected to said output node of said voltage division potential generating means.

8. A constant voltage generating circuit as claimed in claim 7, in which each of said first and second insulated gate field-effect transistors operates in the critical state between the conductive state and the non-conductive state thereof.

9. A constant voltage generating circuit as claimed in claim 7, which said voltage division potential generating means comprises: a first resistive element connected between said first power source terminal and said output node; and a second resistive element connected between said second power source terminal and said output node.

10. A constant voltage generating circuit as claimed in claim 9, in which said second resistive element is a series circuit of a plurality of insulated gate field-effect transistors.

11. A constant voltage generating circuit as claimed in claim 9, in which said first resistive element is a seventh insulated gate field-effect transistor of said first polarity, and said second resistive element is an eighth insulated gate field-effect transistor of said second polarity.

12. A constant voltage generating circuit as claimed in claim 7, in which said first load element is a fifth insulated gate field-effect transistor of said first polarity, and said second load element is a sixth insulated gate field-effect transistor of said second polarity, and said voltage division potential generating means comprises: a seventh insulated gate field-effect transistor of said first polarity connected between said first power source terminal and said output node; and an eighth insulated gate field-effect transistor of said second polarity connected between said output node and said second power source terminal.

13. A constant voltage generating circuit, comprising:

a first insulated gate field-effect transistor of a first polarity having a pair of main electrodes and a control electrode, said first insulated gate field-effect transistor being connected between a first power source terminal and an output terminal;

a second insulated gate field-effect transistor of a second polarity having a pair of main electrodes and a control electrode and connected between said output terminal and a second power source terminal;

voltage division potential generating means connected between said first power source terminal and said second power source terminal and having first and second nodes, for providing first and second voltage division potentials respectively at said first and second nodes, said first voltage division potential being higher than said second voltage division potential;

a third insulated gate field-effect transistor of said second polarity having a pair of main electrodes and a control electrode, one of said main electrodes being connected to said first power source terminal through a first load element and to the control electrode of said first insulated gate field-effect transistor, the other main electrode being connected to said second power source terminal, and said control electrode being connected to said second output node of said voltage division potential generating means; and a fourth insulated gate field-effect transistor of said first polarity having a pair of main electrodes and a control electrode, one of said main electrodes being connected to said second power source terminal through a second load element and to the control electrode of said second insulated gate field-effect transistor, the other main electrode being connected to said first power source terminal, and said control electrode being connected to said first output node of said voltage division potential generating means.

14. A constant voltage generating circuit as claimed in claim 11, in which said voltage division potential generating means comprises: a first resistive element connected between said first power source terminal and said first output node; a second resistive element connected between said first and second output nodes; and a third resistive element connected between said second output node and said second power source terminal.

15. A constant voltage generating circuit as claimed in claim 12, in which each of said first and second insulated gate field-effect transistor operates in the critical state between the conductive state and the non-conductive state thereof.

[16. A constant voltage generating circuit, comprising:

a first output transistor of a first polarity and having its conduction path coupled between a first source potential and an output terminal;

a second output transistor of a second polarity and having its conduction path coupled between said output terminal and a second source potential;

each of said first and second output transistors having a control electrode and having a conductive state, a non-conductive state and a critical range between the conductive and non-conductive states where the potential difference between its control electrode and output terminal is substantially equal to the threshold voltage of the transistor; and control means for providing control voltages to control electrodes of said first and second output transistors to simultaneously operate both of said output transistors in said critical range between their off and on states.]

[17. A constant voltage generating circuit, comprising:

a first insulated gate field-effect transistor of a first polarity having a pair of main electrodes and a control electrode and connected between a first power source terminal and an output terminal;

a second insulated gate field-effect transistor of a second polarity having a pair of main electrodes and a control electrode and connected between said output terminal and a second power source terminal; and control voltage applying means for applying a first intermediate potential provided between a first potential at said first power source terminal and a second potential at said second power source terminal to the control electrode of said first insulated gate field-effect transistor, and for applying a second intermediate potential provided between said first potential and said second potential to the control electrode of said second insulated gate field-effect transistor, said first and second intermediate potentials changing in response to changes in said first and second potentials to change the conductivities of said first and second output transistors and maintain a constant voltage at said output terminal despite fluctuations in said first or second potentials.]

18. A constant voltage generating circuit, comprising:

a first insulated gate field-effect transistor of a first polarity having a pair of main electrodes and a control electrode and connected between a first power source terminal and an output terminal;

a second insulated gate field-effect transistor of a second polarity having a pair of main electrodes and a control electrode and connected between said output terminal and a second power source terminal;

control voltage applying means for applying a first intermediate potential provided between a first potential at said first power source terminal and a second potential at said second power source terminal to the control electrode of said first insulated gate field-effect transistor, and for applying a second intermediate potential provided between said first potential and said second potential to the control electrode of said second insulated gate field effect transistor, said first intermediate potential being at all times greater than said second intermediate potential by substantially the sum of the threshold voltage of the said first and second insulated gate field effect transistors, said first and second intermediate potential applying means comprising transistors of said second and first polarities, respectively.

19. A constant voltage generating circuit comprising:

a first insulated gate field-effect transistor of a first polarity having a pair of main electrodes and a control electrode and connected between a first power source terminal and an output terminal;

a second control insulated gate field-effect transistor of a second polarity having a pair of main electrodes and a control electrode and connected between said output terminal and a second power source terminal; and control voltage applying means for applying a first intermediate potential provided between a first potential at said first power source terminal and a second potential at said second power source terminal to the control electrode of said first insulated gate field effect transistors, and for applying a second intermediate potential provided between said first potential and said second potential to the control electrode of said second insulated gage field-effect transistor, said first intermediate potential being at all times greater than said second intermediate potential by substantially the sum of the absolute value of the threshold voltage of said first insulated gate field-effect transistor and the threshold voltage of said second insulated gate field effect transistor minus a predetermined voltage, said first and second intermediate potential applying means comprising transistors of said second and first polarities, respectively.]

*20. A constant voltage generating circuit, comprising:*

*a first output transistor of a first polarity and having its conduction path coupled between a first power source terminal and an output terminal;*

*a second output terminal of a second polarity and having its conduction path coupled between said output terminal and a second power source terminal;*

*each of said first and second output transistors having a control electrode and having a conductive state, a non-conductive state and a critical range between the conductive and non-conductive states where the potential difference between its control electrode and output terminal is substantially equal to the threshold voltage of the transistor; and*

*control means for providing control voltages to control electrodes of said first and second output transistors to simultaneously operate both of said transistors in said critical range between their off and on states and such that said first output transistor conducts if a negative noise voltage occurs at said output terminal and said second output transistor conducts if a positive noise voltage occurs at said output terminal.*

*21. The constant voltage generating circuit of claim 20, wherein said control voltage providing means comprises means for generating a predetermined voltage which is independent of a potential difference between said first and second power source terminals.*

*22. The constant voltage generating circuit of claim 20, wherein said second control voltage has a value such that said second output transistor is operated in said non-conductive state.*

*23. The constant voltage generating circuit of claim 20, wherein said second control voltage has a value such that said second output transistor is operated in said non-conductive state to compensate for variations in threshold voltages of said first and second outupt transistors.*

* * * * *